(12) United States Patent
Lee (10) Patent No.: US 8,090,927 B2
(45) Date of Patent: Jan. 3, 2012

(54) METHOD AND SYSTEM FOR EXECUTING APPLICATONS, STORAGE MEDIUM CONTROLLER AND STORAGE DEVICE

(75) Inventor: Chien-Fu Lee, Yunlin County (TW)

(73) Assignee: Phison Electronics Corp., Miaoli (TW)

( * ) Notice: Subject to any disclaimer, the term of this patent is extended or adjusted under 35 U.S.C. 154(b) by 329 days.

(21) Appl. No.: 12/572,488

(22) Filed: Oct. 2, 2009

(65) Prior Publication Data

US 2011/0055513 A1 Mar. 3, 2011

(30) Foreign Application Priority Data

Aug. 31, 2009 (TW) .............................. 98129287 A (51) Int. Cl.
*G06F 12/00* (2006.01)
(52) U.S. Cl. ....................................................... 711/173
(58) Field of Classification Search ........................ None
See application file for complete search history.

(56) References Cited

U.S. PATENT DOCUMENTS 7,111,121 B2 * 9/2006 Oishi et al. .................... 711/115
2008/0244619 A1 * 10/2008 Jeon et al. ..................... 719/321
2010/0211734 A1 * 8/2010 Chiu ............................. 711/114

* cited by examiner

*Primary Examiner* — Hiep Nguyen
(74) *Attorney, Agent, or Firm* — J.C. Patents (57) ABSTRACT

An application executing method for automatically executing an application stored in a storage unit of an external storage device in an operating system (OS) of a computer host is provided. The method includes dividing the storage unit into a first partition and a second partition; emulating the first partition as compact disc-read only memory (CR-ROM); storing a switch program in the first partition; and storing the application in the second partition. The method also includes providing only the first partition to be accessed by the OS and automatically executing the switch program by the OS to decouple and re-couple the external storage device to the computer host. Additionally, the method further includes providing only the second partition to be accessed by the OS and executing the application when the external storage device is re-coupled to the computer host.

20 Claims, 7 Drawing Sheets

METHOD AND SYSTEM FOR EXECUTING APPLICATONS, STORAGE MEDIUM CONTROLLER AND STORAGE DEVICE

CROSS-REFERENCE TO RELATED APPLICATION

This application claims the priority benefit of Taiwan application serial no. 98129287, filed on Aug. 31, 2009. The entirety of the above-mentioned patent application is hereby incorporated by reference herein and made a part of specification.

BACKGROUND

1. Field of the Invention

The present invention is related to an application executing method and system, more particularly to an application executing method, system capable of automatically executing an application stored in an external storage device, and a storage medium controller and an external storage device applying the method and system thereof.

2. Description of Related Art

The growth of digital cameras, mobile phones, and MP3 players has been rapid in recent years. Consequently, the consumers' demand for storage media has increased tremendously. Since flash memories are adapted have the characteristics of non-volatile data, power saving, smaller size, and non-mechanical structure, flash memories are suitable for being used as portable storage devices. Moreover, with the development of the plug-and-play interface (i.e. the universal serial bus, USB), the portable storage devices are widely applied for storing digital contents.

In order to increase the market competitiveness of the portable storage devices sold on the market, the manufactures of the storage devices usually store applications in the portable storage devices sold on the market for the users who buy the portable storage devices to use. For instance, the manufactures develop the disk management program used on the portable storage device and pre-store the disk management program in the portable storage device. Therefore, the user can use this disk management program to manage the storage state of the portable storage device.

Currently, in order to automatically execute this kind of applications provided by the manufactures, the manufactures partition off part of the storage unit of the portable storage device as a compact disc-read only memory (CD-ROM) partition and the applications and the auto-execution file (e.g. the script file with the filename as "Autorun.inf") are programmed into the CD-ROM partition in advance for the operating system of the computer host to automatically execute the provided applications.

However, the files in the CD-ROM partition cannot be updated. Therefore, under the circumstance that the development applications are provided to the users according to the aforementioned method, it is difficult for the user to update the provided application when the manufactures provide new editions of the provided applications. Alternatively, in the example that the user wishes the bought external storage device can automatically execute applications other than the applications provided by the manufactures, it is difficult for the aforementioned method to further program the other applications into the CD-ROM partition for the operating system of the computer host to automatically execute.

Nothing herein should be construed as an admission of knowledge in the prior art of any portion of the present invention. Furthermore, citation or identification of any document in this application is not an admission that such document is available as prior art to the present invention, or that any reference forms a part of the common general knowledge in the art.

SUMMARY

The invention provides an application executing method capable of automatically executing an application stored in a general partition of an external storage device when the external storage device is coupled to the computer host.

The invention provides an application executing system capable of automatically executing an application stored in a general partition of an external storage device when the external storage device is coupled to the computer host.

The invention provides a storage medium controller capable of switching different partitions for the computer host to automatically execute an application stored in a general partition of an external storage device when the external storage device is coupled to the computer host.

The invention provides an external storage device capable of switching different partitions for the computer host to automatically execute an application stored in a general partition of an external storage device when the external storage device is coupled to the computer host.

The exemplary embodiment of the present invention provides an application executing method for automatically executing an application stored in a storage unit of an external storage device in an operating system of a computer host. The application executing method comprises logically dividing the storage unit into a first partition and a second partition and emulating the first partition as compact disc-read only partition. The application executing method also comprises programming an auto-execution file and a switch program into the first partition and storing the application into the second partition, wherein the auto-execution file is used to automatically execute the switch program and the switch program is used to automatically execute the application. The application executing method further comprises configuring a storage medium controller in the external storage device, wherein, when the external storage device is coupled to the computer host, the storage medium controller only provides the first partition to be identified by the operating system and the auto-execution file is automatically executed by the operating system and the switch program is executed by the auto-execution file and the switch program requests the storage medium controller to decouple the external storage device to the computer host and to re-couple the external storage device to the computer host. Moreover, when the storage medium controller re-couples the external storage device to the computer host, the present application executing method further comprises only provides the second partition by the storage medium controller for the operating system to identify and the switch program executes the application.

The exemplary embodiment of the present invention provides an application executing system for automatically executing an application in an operating system. The application executing system comprises a computer host and an external storage device. The computer host has a built-in storage device, wherein the built-in storage device is installed with the operating system. The external storage device comprises a storage unit, an auto-execution file, a switch program and a storage medium controller. The storage unit has a first partition and a second partition, wherein the application is stored in the second partition. The auto-execution file and the switch program are configured in the first partition. The storage medium controller is coupled to the storage unit and is used to emulate the first partition as a compact disc-read only partition, wherein, when the external storage device is couple to the computer host, the storage medium controller only provides the first partition to be identified by the computer host and the operating system automatically executes the auto-execution file and the auto-execution file executes the switch program and the switch program requests the storage medium controller to decouple the external storage device to the computer host and to re-couple the external storage device to the computer host. Furthermore, when the storage medium controller re-couples the external storage device to the computer host, the storage medium controller only provides the second partition to be identified by the operating system and the switch program executes the application.

The exemplary embodiment of the present invention provides a storage medium controller for receiving a command from an operating system of a computer host and for controlling a storage unit of an external storage device, wherein the storage unit comprises a first partition and a second partition, the first partition stores an auto-execution file and a switch program, and the second partition stores an application. The storage medium controller comprises a microprocessor unit, a storage medium interface unit, a host interface unit and a storage medium management unit. The storage medium interface unit is coupled to the microprocessor unit and is coupled to the storage unit. The host interface unit is coupled to the microprocessor unit and is coupled to the computer host. The storage medium management unit is coupled to the storage unit and is used to emulate the first partition as a compact disc-read only partition, wherein, when the external storage device is couple to the computer host, the storage medium management unit only provides the first partition to be identified by the computer host and the operating system automatically executes the auto-execution file and the auto-execution file executes the switch program and the switch program requests the storage medium management unit to decouple the host interface unit to the computer host and to re-couple the host interface unit to the computer host. In addition, when the storage medium management unit re-couples the host interface unit to the computer host, the storage medium management unit only provides the second partition to be identified by the operating system and the switch program executes the application.

The exemplary embodiment of the present invention provides an external storage device comprising a connector, a storage unit and a storage medium controller. The storage unit has a first partition and a second partition, wherein the first partition stores an auto-execution file and a switch program and the second partition stores the application. The storage medium controller is coupled to the connector and the storage unit and is used to emulate the first partition as a compact disc-read only partition, wherein, when the connector is couple to the computer host, the storage medium controller only provides the first partition to be identified by the computer host and the operating system automatically executes the auto-execution file and the auto-execution file executes the switch program and the switch program requests the storage medium controller to decouple the connector to the computer host and to re-couple the connector to the computer host. Furthermore, when the storage medium controller re-couples the connector to the computer host, the storage medium controller only provides the second partition to be identified by the operating system and the switch program executes the application.

The exemplary embodiment of the present invention provides an application executing method comprising providing an external storage device with a storage unit having a first partition and a second partition, wherein the first partition has an auto-execution file and a switch program and the second partition has the application. The application executing method also comprises, when the external storage device is coupled to a computer host, only providing the first partition by a storage medium controller of the external storage device for an operating system of the computer host to identify, and the operating system executes the switch program through the auto-execution file. The application executing method further comprises informing the storage medium controller by the switch program to only provide the second partition for the operating system to identify, and executing the application by the switch program after the operating system identifies the second partition.

According to the above description, the exemplary embodiments of the present invention can automatically execute an application stored in the general partition and it is easier to update the application.

It should be understood, however, that this Summary may not contain all of the aspects and embodiments of the present invention, is not meant to be limiting or restrictive in any manner, and that the invention as disclosed herein is and will be understood by those of ordinary skill in the art to encompass obvious improvements and modifications thereto. In order to make the aforementioned and other features and advantages of the invention more comprehensible, embodiments accompanied with figures are described in detail below.

BRIEF DESCRIPTION OF THE DRAWINGS

The accompanying drawings are included to provide a further understanding of the invention and are incorporated in and constitute a part of this specification. The drawings illustrate embodiments of the invention and, together with the description, serve to explain the principles of the invention.

DESCRIPTION OF EMBODIMENTS

Embodiments of the present invention may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least on of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

First Embodiment

Figure 1:
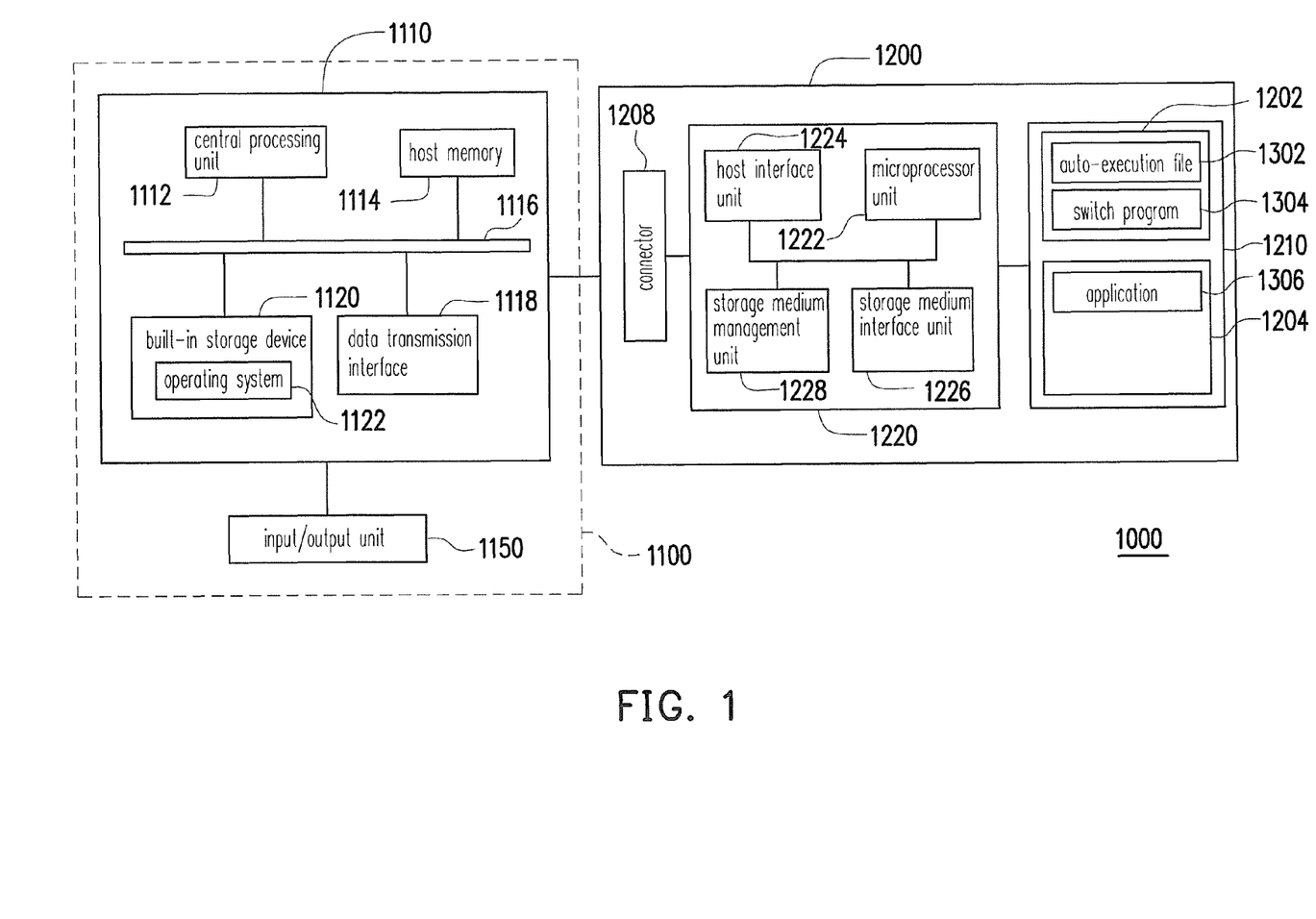
FIG. 1 is a schematic block diagram illustrating an application executing system according to a first exemplary embodiment of the present invention.

FIG. 1 is a schematic block diagram illustrating an application executing system according to a first exemplary embodiment of the present invention.

As shown in FIG. 1, an application executing system 1000 comprises a host system 1100 and an external storage device 1200.

The host system 1100 comprises a computer host 1110 and an input/output (I/O) device 1150.

In the present exemplary embodiment, the computer host 1110 can be a desktop personal computer. It should be noticed that the present invention is not limited thereto and, in another exemplary embodiment of the present invention, the computer host 1110 also can be a notebook computer, a server or any computer host which can execute computer programs. The computer host 1110 comprises a central processing unit (CPU) 1112, a host memory 1114, a system bus 1116, a data transmission interface 1118, a built-in storage device 1120 and an operating system 1122 installed in the built-in storage device 1120.

The central processing unit 1112 is used to explain the computer commands and to handle the data in the computer software.

The host memory 1114 is coupled to the central processing unit 1112 through the system bus 1116 and various programs and data are loaded into the host memory 1114 for the central processing unit 1112 to execute and operate. Specifically, the host memory 1114 possesses the characteristics of relatively high read-and-write speed and the ability to read and write in anytime so that the host memory 1114 can be used as the temporary data storage medium of the operating system 1122 or other programs which are currently in execution. In the present exemplar embodiment, the host memory 1114 can be the dynamic random access memory (DRAM). Moreover, it should be noticed that, in another exemplary embodiment of the present invention, the operating system also can use the virtual memory which is emulated from the storage space of the storage device to be the temporary data storage medium for executing the application, and in the present embodiment, the host memory further comprises this virtual memory.

The data transmission interface 1118 is coupled to the central processing unit 1112 through the system bus 1116 and is used to couple to the external storage device 1200. In the present exemplary embodiment, the data transmission interface can be the universal serial bus (USB) interface. However, it should be noticed that the present invention is not limited thereto and the data transmission interface 1118 also can be the serial advanced technology attachment (SATA) interface, the institute-of-electrical-and-electronic engineers (IEEE) 1394 interface, the peripheral component-interconnect-express (PCI Express) interface or other suitable interface.

The built-in storage device 1120 is coupled to the central processing unit 1112 through the system bus 1116 for being the major storage device of the computer host 1110. In the present exemplary embodiment, the built-in storage device 1120 can be a hard disk. However, it should be understood that the present invention is not limited thereto. The built-in storage device 1120 is installed with the operating system 1122 and the operating system 1122 is the program used to manage resources of the computer hardware and the computer software. Specifically, the operating system 1122 is used to manage and allocate the host memory 1114, to determine the priority order of the system resource (e.g. the central processing unit 1112, the host memory 1114, and the input/output unit 1150) supply-and-demand, to control the input/output unit 1150 and to manage the operations of the file system. In the present exemplary embodiment, the operating system 1122 can be the Microsoft Windows operating system. However, it should be noticed that the present invention is not limited thereto and the present invention can be also applied onto the Linux operating system, the Mac operating system or other operating system.

Figure 2:
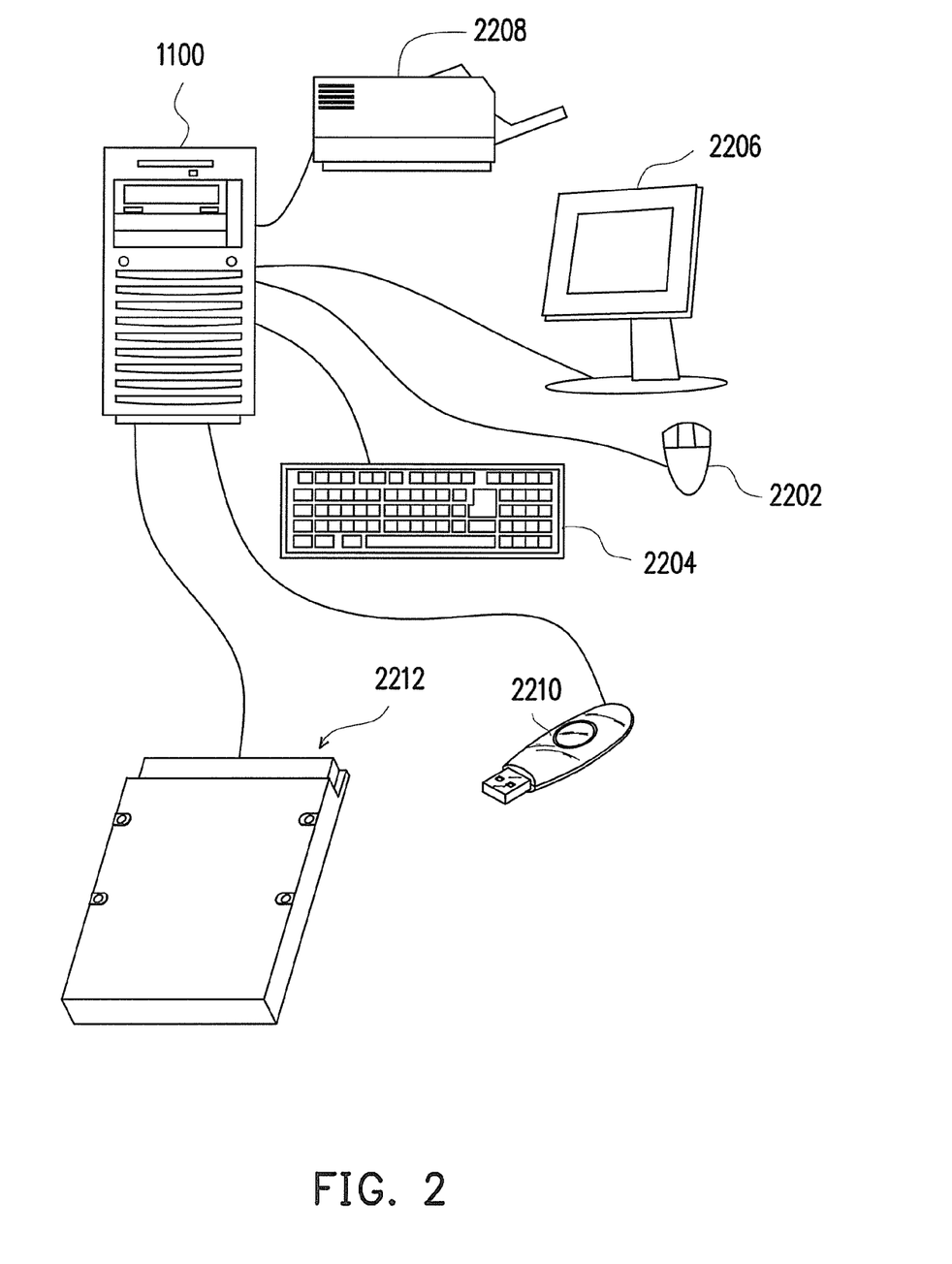
FIG. 2 is a schematic diagram illustrating a computer, input/output device and a flash memory storage device according to one exemplary embodiment of the present invention.

The input/output unit 1150 is coupled to the computer host 1110. In the present exemplary embodiment, the input/output unit 1150 can be, for example but not limited to, a mouse 2202, a keyboard 2204, a display 2206 and a printer 2208 (as shown in FIG. 2). It should be noticed that the devices shown in FIG. 2B are not used to limit the input/output unit 1150 and the input/output unit 1150 can be any other devices.

The external storage device 1200 can be a plug-and-play storage device and is coupled to the computer host 1110 in a removable manner. For instance, the external storage device 1200 can be the flash disk 2210 or a solid state drive (as shown in FIG. 2).

The external storage device 1200 comprises a connector 1208, a storage unit 1210 and a storage medium controller 1220.

The connector 1208 is coupled to a computer host 1110. In this exemplary embodiment, the connector 1208 is a USB connector. However, it should be noticed that the present invention is not limited thereto, and the connector 1208 may also be a SATA connector, an IEEE 1394 connector, a PCI Express connector or other suitable types of connectors.

The storage unit 1210 is used to store data. For instance, the storage unit 1210 can be a flash memory. Particularly, in the present exemplary embodiment, the storage space of the storage unit 1210 is logically divided into a first partition 1202 and a second partition 1204, wherein the first partition 1202 stores an auto-execution file 1302 and a switch program 1304 and the second partition 1204 stores an application 1306. Herein, the auto-execution file 1302 can be a script file to be automatically executed by the operating system and the content of the auto-execution file 1302 comprises the description language for executing the switch program 1304 and the application 1306 is the program to be provided to the user by the manufacture of the external storage device 1200. Moreover, the switch program 1304 is used to switch the accessible partition of the operating system 1122 from the first partition 1202 to the second partition 1204 when the external storage device 1200 is coupled to the computer host 1110.

The storage medium controller 1220 is coupled to the connector 1208 and the storage unit 1210 and is used to receive the commands of the computer host 1110 and to control the operations of the external storage device 1200. The storage medium controller 1220 comprises a microprocessor unit 1222, a host interface unit 1224, a storage medium interface unit 1226 and a storage medium management unit 1228.

The microprocessor unit 1222 is the host control unit of the storage medium controller 1220 for cooperating with the host interface unit 1224, the storage medium interface unit 1226 and the storage medium management unit 1228 to perform various operations of the external storage device 1200.

The host interface unit 1224 is coupled to the microprocessor unit 1222 and is used to receive and to identify the command and the data transmitted from the computer host 1110 and to transmit the data to the computer host 1110. In the present exemplary embodiment, the host interface unit 1224 is a USB interface. However, it should be noticed that the present invention is not limited thereto, and the host interface unit 1224 may also be a SARA interface, an IEEE 1394 interface, a PCI Express interface or other suitable types of interfaces. It should be noticed that the host interface unit 1224, the connector 1208 and the data transmission interface 1118 should be corresponding to the interfaces or the connectors with the same standards for performing the data transmission.

The storage medium interface unit 1226 is coupled to the microprocessor unit 1222 and is coupled to the storage unit 1210. For instance, the storage medium interface unit 1226 can be a flash memory interface unit.

The storage medium management unit 1228 is coupled to the microprocessor unit 1222 to cooperate with the switch program 1304 for implementing the application executing mechanism and the storage space management mechanism according to one exemplary embodiment of the present invention.

In the exemplary embodiment of the present invention, the storage medium management unit 1228 emulates the first partition 1202 in the storage unit 1210 as a compact disc-read only partition. Particularly, when the external storage device 1200 is coupled to the computer host 1110, the storage medium management unit 1228 announces the external storage device 1200 as a first storage device category (i.e. the compact disc-read only memory) to the operating system 1122 and the operating system 1122 only can identify the first partition 1202 and cannot identify the second partition 1204. Specifically, in the present exemplary embodiment, the storage medium management unit 1228 informs the operating system 1122 that the external storage device 1200 is the compact disc-read only memory only having the first partition 1202 and the operating system 1122 manages the external storage device 1200 according to the aforementioned information. In the other words, the operating system 1122 regards the external storage device 1200 as a compact disc-read only memory, wherein the content stored in this compact disc-read only memory comprises the auto-execution file 1302 and the switch program 1304. Herein, since the external storage device 1200 is regarded as the compact disc-read only memory when the external storage device 1200 is coupled to the computer host 1110, the operating system 1122 automatically executes the auto-execution file 1302 stored in the first partition 1202 and executes the switch program 1304 according to the description language of the auto-execution file 1302. That is, the operating system 1122 allocates an address block in the host memory 1114 for running the switch program 1304.

When the switch program runs, the switch program 1304 transmits a switching partition command to the storage medium management unit 1228 so as to switch the identifiable partition from the first partition 1202 to the second partition 1204.

For instance, when the storage medium management unit 1228 receives the switching partition command, the storage medium management unit 1228 indicates the host interface unit 1224 and the data transmission interface 1118 to be decoupled to each other (i.e. the connector 1208 is decoupled to the computer host 1110) and then to be re-coupled to each other (i.e. the connector 1208 is re-coupled to the computer host 1110). Particularly, when the storage medium management unit 1228 receives the switching partition command, the storage medium management 1228 changes a corresponding flag value and exchanges the identification information to be provided to the computer host 1110. Thereafter, when the operating system 1122 queries the flash memory storage device 1200 about the identification information (e.g. the operating system 1122 of the computer host 1110 keeps on confirming the corresponding flag value with a consistent frequency) once again since the operating system 1122 is aware of the changing of the flag value, the storage medium management unit 1228 transmits the changed identification information to the operating system 1122. That is, when the host interface unit 1224 is re-coupled to the data transmission interface 1118, the storage medium management unit 1228 announces the external storage device 1200 as a second storage device category to the operating system 1122, wherein the storage space of the second storage device is the second partition 1204. For instance, in the present exemplary embodiment, the second storage device category can be a removable storage device. In the other words, the operating system 1122 only can identify and access the second partition 1204 and cannot identify and access the first partition 1202. Meanwhile, when the switch program 1304 run in the host memory 1114 detects that the external storage device 1200 is re-coupled to the computer host 1110, the switch program 1304 searches the application 1306 in the second partition 1204 and executes the application 1306. That is, the switch program 1304 would request the operating system 1122 to allocate an address block in the host memory 1114 for running the application 1306.

It should be noticed that, in the present exemplary embodiment, the second partition 1204 can be a readable and writable partition. Therefore, when the user obtains an updated edition of the application 1306 from the manufacture, the user can override the application 1306 in the second partition 1204 by using the obtained updated edition of the application 1306. Accordingly, the user can easily update the application 1306.

In the present exemplary embodiment, the storage medium management unit 1228 is implemented as a firmware form in the storage medium controller 1220. For instance, the storage medium management unit 1228 including a plurality of control commands is programmed into a program memory (e.g. read only memory, ROM) and the program memory is embedded into the storage medium controller 1220. When the external storage device 1200 operates, the plurality of control commands of the storage medium management unit 1228 are executed by the microprocessor unit 1222 to finish the application executing mechanism and the storage space management mechanism according to the embodiments of the present invention.

In another exemplary embodiment, control commands of the storage medium management unit 1228 also can be stored in the storage unit 1210 in a software form. Similarly, when the external storage device 1200 operates, the plurality of the control commands of the storage medium management unit 1228 are executed by the microprocessor unit 1222. In addition, in another exemplary embodiment of the present invention, the storage medium management unit 1228 also can be stored in the storage medium controller 1220 as a firmware form.

Figure 3:
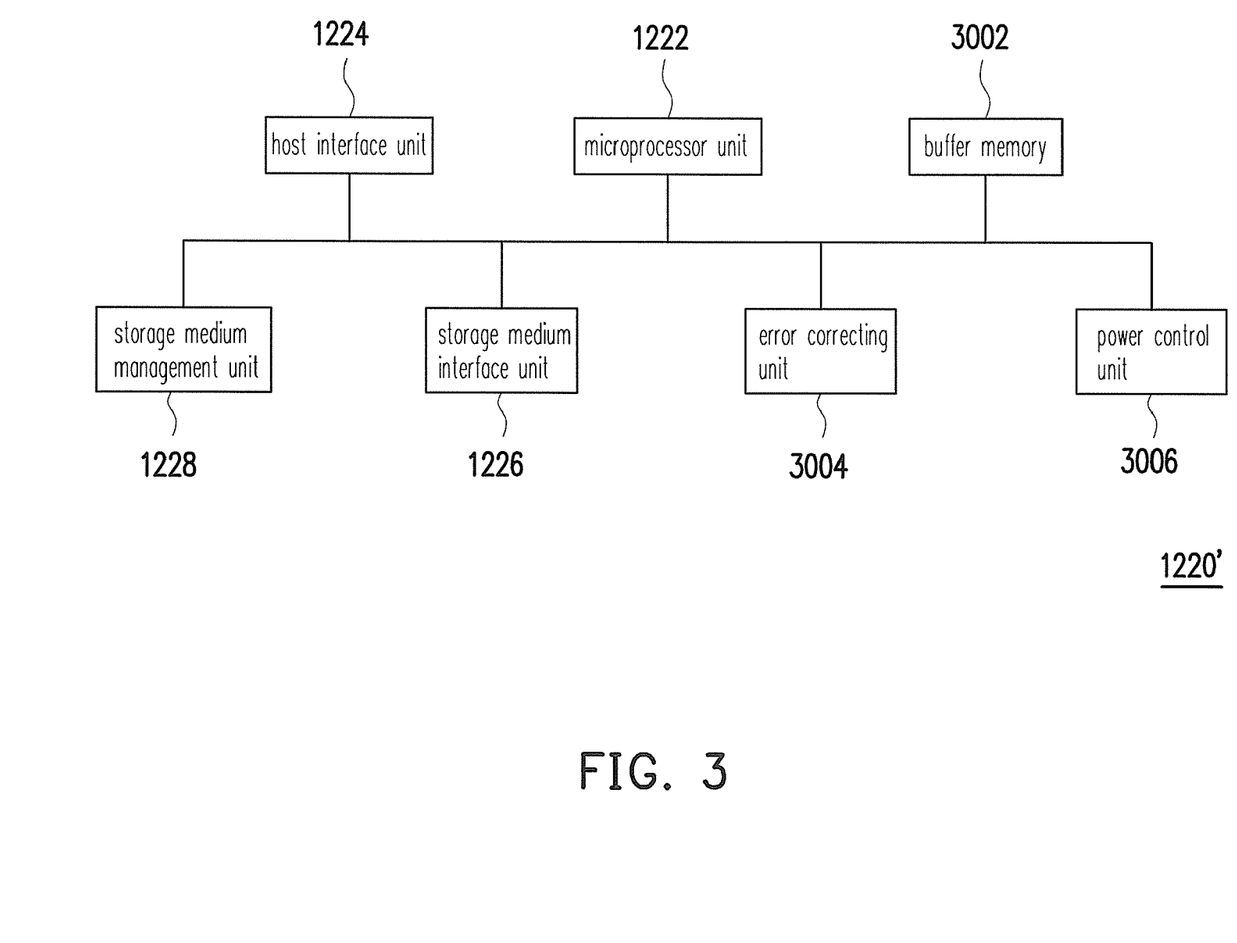
FIG. 3 is a schematic block diagram illustrating storage medium controller according to another exemplary embodiment of the present invention.

FIG. 3 is a schematic block diagram illustrating storage medium controller according to another exemplary embodiment of the present invention.

As shown in FIG. 3, besides the microprocessor unit 1222, the host interface unit 1224, the storage medium interface unit 1226 and the storage medium management unit 1228, the storage medium controller 1220 also comprises a buffer memory 3002, an error correcting unit 3004 and a power control unit 3006.

The buffer memory 3002 is coupled to the microprocessor unit 1222 for temporarily storing the data from the computer host 290 or the data from the storage unit 1210.

The error correcting unit 3004 is coupled to the microprocessor unit 1222 and is used to execute an error correcting procedure to ensure the correctness of the data. Specifically, when the storage medium management unit 1228 receives a host write-in command from the computer host 1110, the error correcting unit 3004 generates an error correcting code (ECC) corresponding to the data to be written of the host write-in command, and the storage medium management unit 1228 writes the data to be written and the corresponding error correcting code into the storage unit 1210. Alternatively, when the storage medium management unit 1228 receives a host read command from the computer host 1110, the storage medium management unit 1228 reads the data corresponding to the host read command from the storage unit 1210 and the error correcting code of the data, and the error correcting unit 3004 implements the error correcting on the read data according to the error correcting code.

The power management unit 3006 is coupled to the microprocessor unit 1222 and is used to control the power of the external storage device.

Figure 4:
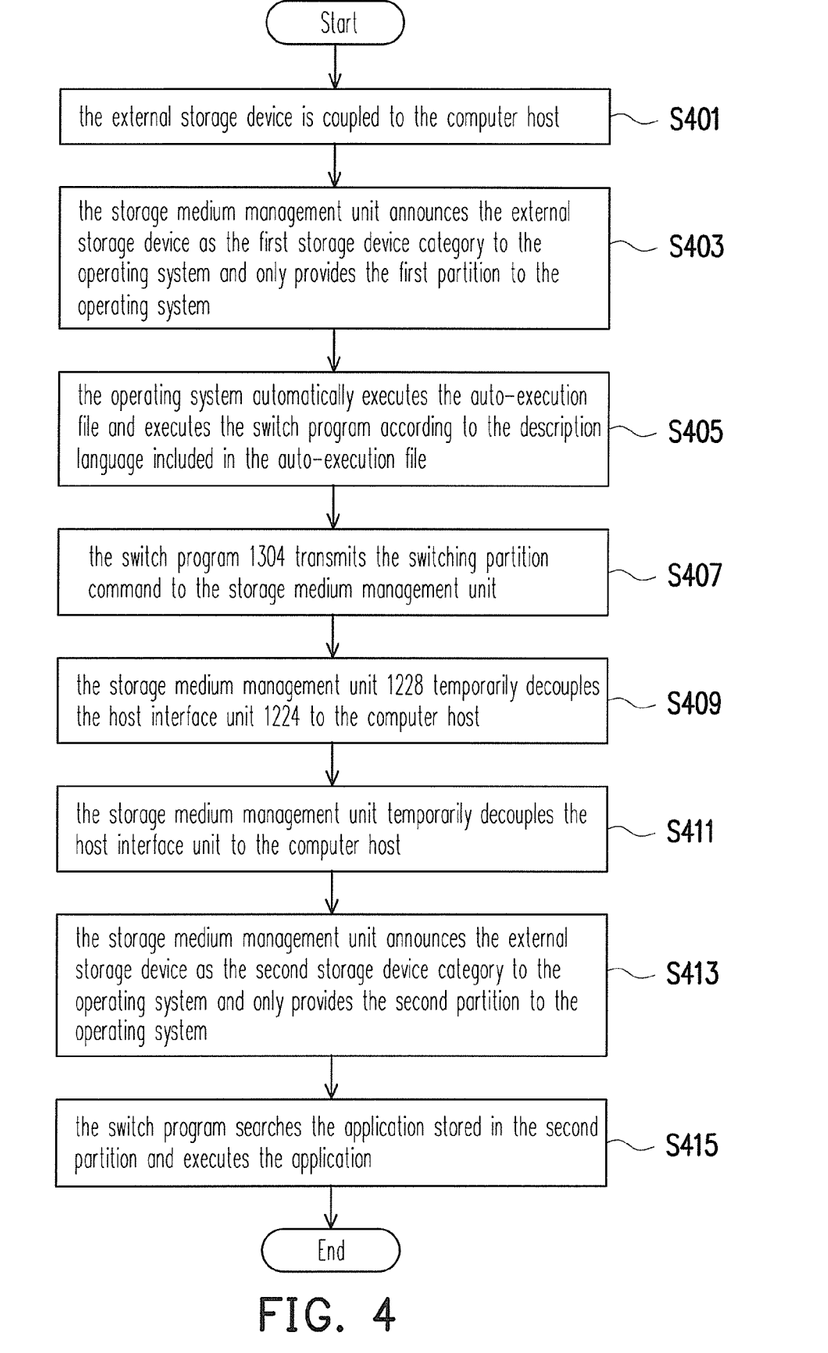
FIG. 4 is a flow chart illustrating an application executing method according to a first exemplary embodiment of the present invention.

FIG. 4 is a flow chart illustrating an application executing method according to a first exemplary embodiment of the present invention.

As shown in FIG. 4, first, in the step S401, the external storage device 1200 is coupled to the computer host 1110.

In the step S403, the storage medium management unit 1228 announces the external storage device 1200 as the first storage device category (i.e. the compact disc-read only memory) to the operating system 1122 and only provides the first partition 1202 to the operating system 1122.

Then, in the step S405, the operating system 1122 automatically executes the auto-execution file 1302 and executes the switch program 1304 according to the description language included in the auto-execution file 1302.

In the step S407, the switch program 1304 transmits the switching partition command to the storage medium management unit 1228. Thereafter, in the step S409, the storage medium management unit 1228 temporarily decouples the host interface unit 1224 to the computer host 1110 and, in the step S411, the storage medium management unit 1228 re-couples the host interface unit 1224 to the computer host 1110. Then, in the step S413, the storage medium management unit 1228 announces the external storage device 1200 as the second storage device category (i.e. the removable storage device) to the operating system 1122 and only provides the second partition 1204 to the operating system 1122.

Finally, in the step S415, the switch program 1304 searches the application 1306 stored in the second partition 1204 and executes the application 1306.

Moreover, in another exemplary embodiment of the present invention, the execution steps of the application further comprises that the switch program 1304 is self-terminated after the switch successfully runs the application 1306 in the host memory 1114.

Second Embodiment

Figure 5:
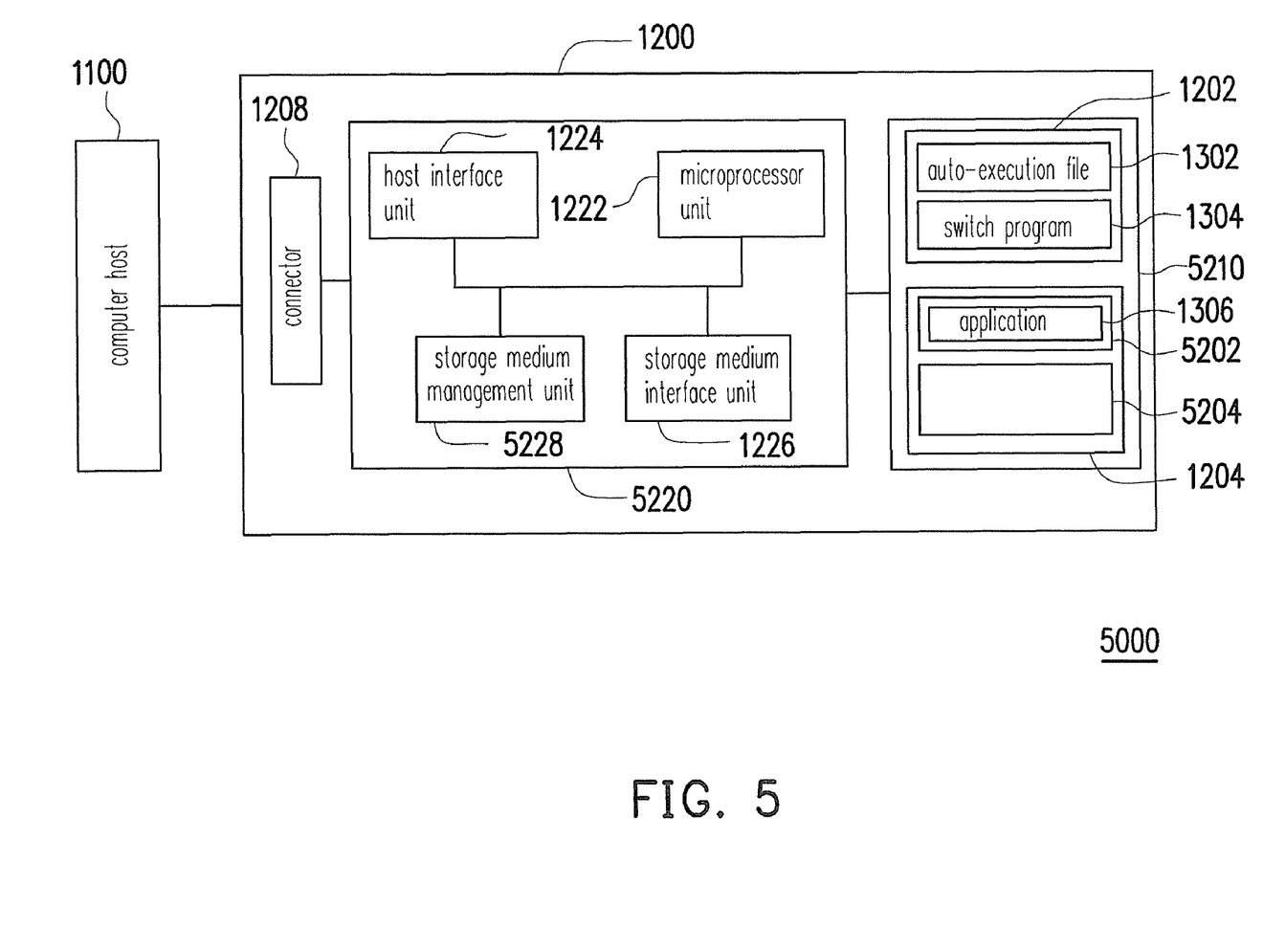
FIG. 5 is a schematic block diagram illustrating an application executing system according to a second exemplary embodiment of the present invention.

FIG. 5 is a schematic block diagram illustrating an application executing system according to a second exemplary embodiment of the present invention.

As shown in FIG. 5, an application executing system 5000 comprises a host system 1100 and an external storage device 5200.

The structure and the function of the host system 1100 are detailed described in above embodiments and are not repeatedly described herein.

The external storage device 5200 can be a plug-and-play storage device and is coupled to the computer host 1110 in a removable manner. For instance, the external storage device 5200 can be the flash disk or a solid state drive (as shown in FIG. 2). The external storage device 5200 comprises the connector 1208, a storage unit 5210 and a storage medium controller 5220, wherein the structure and the function of the connector 1208 are detailed described in above embodiments and are not repeatedly described herein.

Similar to the storage unit 1210, the storage space of the storage unit 5210 is logically divided into the first partition 1202 and the second partition 1204, wherein the first partition 1202 stores an auto-execution file 1302 and a switch program 1304. In the present exemplary embodiment, the second partition 1204 is logically divided into a third partition 5202 and a fourth partition 5204 and the application 1306 is stored in the third partition 5202.

The storage medium controller 5220 is coupled to the connector 1208 and the storage unit 5210 and is used to receive the commands of the computer host 1100 and to control the operations of the external storage device 5200. The storage medium controller 5220 comprises the microprocessor unit 1222, the host interface unit 1224, the storage medium interface unit 1226 and the storage medium management unit 5228, wherein the structures and the functions of the microprocessor unit 1222, the host interface 1224 and the storage medium interface unit 1226 are detail described in above embodiments and are not repeatedly described herein.

The storage medium management unit 5228 is coupled to the microprocessor unit 1222 and is substantially equal to the storage medium management unit 1228. The difference between storage medium management unit 5228 and the storage medium management unit 1228 is that the storage medium management unit 5228 announces the external storage device 5200 as the second storage device category to the operating system 1122 after the host interface unit 1224 is re-coupled to the computer host 1110 (i.e. the step S411 in FIG. 4). For instance, in the present exemplary embodiment, the second storage device category is the removable storage device and the storage space of the removable storage device is composed of the third partition 5202 and the fourth partition 5204.

Specifically, in the present exemplary embodiment, when the external storage device 5200 is coupled to the computer host 1110, the storage medium management unit 5228 announces the external storage device 5200 as the first storage device category (i.e. the compact disc-read only memory) to the operating system 1122 and the operating system 1122 only can identify the first partition 1202 and cannot identify the second partition 1204 composed of the third partition 5202 and the fourth partition 5204. Then, the operating system 1122 automatically executes the auto-execution file 1302 in the first partition 1202, and after the operating system 1122 executes the switch program 1304 according to the description language of the auto-execution file 1302, the storage medium management unit 1228 indicates the host interface unit 1224 to decouple with the computer host 1110 (i.e. the connector 1208 is decoupled to the computer host 1110) and then to re-couple with the computer host 1110 (i.e. the connector 1208 is re-coupled to the computer host 1110) according to the command of the switch program 1304. Herein, when the host interface unit 1224 is re-coupled to the computer host 1110, the storage medium management unit 5228 announces the external storage device 5204 as the second storage device category (i.e. the removable storage device) to the operating system 1122 and the operating system 1122 only can identify and access the third partition 5202 and the fourth partition 5204 and cannot identify and access the first partition 1202. Meanwhile, the switch program 1304 searches the application 1306 in the third partition 5202 and executes the application 1306.

It should be noticed that, in the present exemplary embodiment, the storage medium management unit 5228 sets the third partition 5202 as a write protecting partition and sets the fourth partition 5204 as a readable and writable partition. In the other words, the user can use the fourth partition 5204 to store the user information so that the application 1306 stored in the third partition 5202 can be prevented from being mistakenly deleted. Particularly, in the present exemplar embodiment, the manufacture of the external storage device 5200 will provide another mechanism (e.g. a hardware switch or a software program) for the user to disenable the write protecting of the third partition 5202.

Third Embodiment

Figure 6:
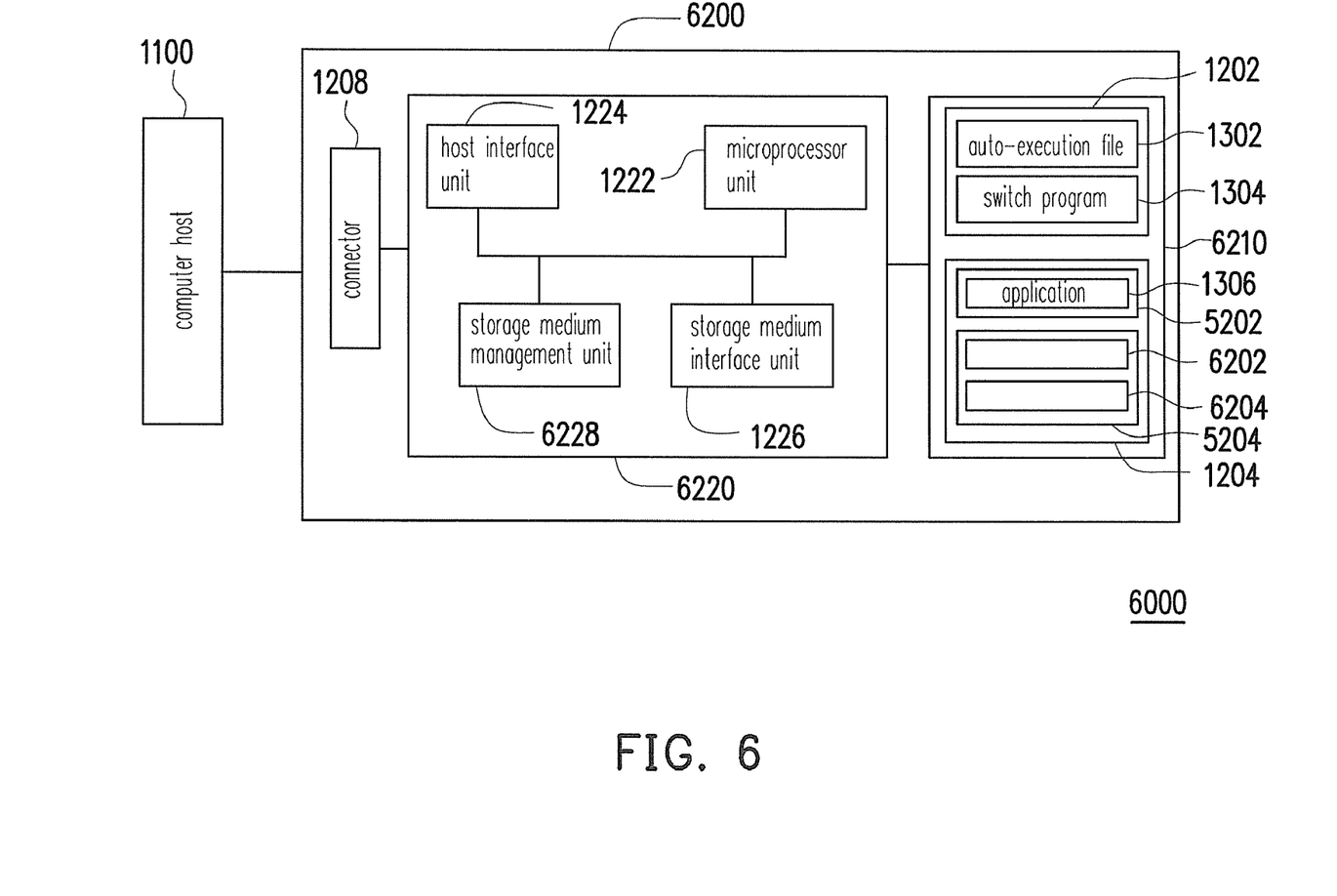
FIG. 6 is a schematic block diagram illustrating an application executing system according to a third exemplary embodiment of the present invention.

FIG. 6 is a schematic block diagram illustrating an application executing system according to a third exemplary embodiment of the present invention.

As shown in FIG. 6, an application executing system 6000 comprises a host system 1100 and an external storage device 6200.

The structure and the function of the host system 1100 are detailed described in above embodiments and are not repeatedly described herein.

The external storage device 6200 can be a plug-and-play storage device and is coupled to the computer host 1110 in a removable manner. For instance, the external storage device 6200 can be the flash disk or a solid state drive (as shown in FIG. 2). The external storage device 6200 comprises the connector 1208, a storage unit 6210 and a storage medium controller 6220, wherein the structure and the function of the connector 1208 are detailed described in above embodiments and are not repeatedly described herein.

Similar to the storage unit 5210, the storage space of the storage unit 6210 is logically divided into the first partition 1202 and the second partition 1204 composed of the third partition 5202 and the fourth partition 5204, wherein the first partition 1202 stores an auto-execution file 1302 and a switch program 1304 and the third partition 5202 of the second partition 1204 stores the application 1306. In the present exemplary embodiment, the fourth partition 5204 is logically divided into a fifth partition 6202 and a sixth partition 6204.

The storage medium controller 6220 is coupled to the connector 1208 and the storage unit 6210 and is used to receive the commands of the computer host 1100 and to control the operations of the external storage device 6200. The storage medium controller 6220 comprises the microprocessor unit 1222, the host interface unit 1224, the storage medium interface unit 1226 and the storage medium management unit 6228, wherein the structures and the functions of the microprocessor unit 1222, the host interface 1224 and the storage medium interface unit 1226 are detail described in above embodiments and are not repeatedly described herein.

The storage medium management unit 6228 is coupled to the microprocessor unit 1222 and is substantially equal to the storage medium management unit 1228. The difference between storage medium management unit 6228 and the storage medium management unit 1228 is that the storage medium management unit 6228 announces the external storage device 6200 as the second storage device category to the operating system 1122 after the host interface unit 1224 is re-coupled to the computer host 1110 (i.e. the step S411 in FIG. 4). For instance, in the present exemplary embodiment, the second storage device category is the removable storage device and the storage space of the removable storage device is composed of the third partition 5202, the fifth partition 6202 and the sixth partition 6204.

Specifically, in the present exemplary embodiment, when the external storage device 6200 is coupled to the computer host 1110, the storage medium management unit 6228 announces the external storage device 6200 as the first storage device category (i.e. the compact disc-read only memory) to the operating system 1122 and the operating system 1122 only can identify the first partition 1202 and cannot identify the third partition 5202, the fifth partition 6202 and the sixth partition 6204. Then, the operating system 1122 automatically executes the auto-execution file 1302 in the first partition 1202, and after the operating system 1122 executes the switch program 1304 according to the description language of the auto-execution file 1302, the storage medium management unit 1228 indicates the host interface unit 6228 to decouple with the computer host 1110 (i.e. the connector 1208 is decoupled to the computer host 1110) and then to re-couple with the computer host 1110 (i.e. the connector 1208 is re-coupled to the computer host 1110) according to the command of the switch program 1304. Herein, when the host interface unit 1224 is re-coupled to the computer host 1110, the storage medium management unit 6228 announces the external storage device 6200 as the second storage device category (i.e. the removable storage device) to the operating system 1122 and the operating system 1122 only can identify and access the third partition 5202, the fifth partition 6202 and the sixth partition 6204 and cannot identify and access the first partition 1202. Meanwhile, the switch program 1304 searches the application 1306 in the third partition 5202 and executes the application 1306.

Particularly, in the exemplary embodiment of the present invention, after the switch program 1304 executes the application 1306 in the third partition 5202, the switch program 1304 searches the other applications in the fifth partition 6202 and, when the other applications are located, the switch program 1304 also executes the found other applications. In the other words, the user, as one wish, can store the applications, which are wished to be automatically run when the external storage device 6200 is coupled to the computer host 1110, in the fifth partition 6202, and the switch program 1304 will automatically execute the applications.

In the present exemplary embodiment, the storage medium management unit 6228 sets the third partition 5202 as a write protecting partition and sets the fifth partition 6202 and the sixth partition 6204 as readable and writable partitions. In the other words, the user can use the fifth partition 6202 to store the application wished to be automatically executed and use the sixth partition 6204 to store the user information so that the application 1306 stored in the third partition 5202 can be prevented from being mistakenly deleted. Similarly, in the present exemplar embodiment, the manufacture of the external storage device 6200 can also provide another mechanism (e.g. a hardware switch or a software program) for the user to disenable the write protecting of the third partition 5202.

Figure 7:
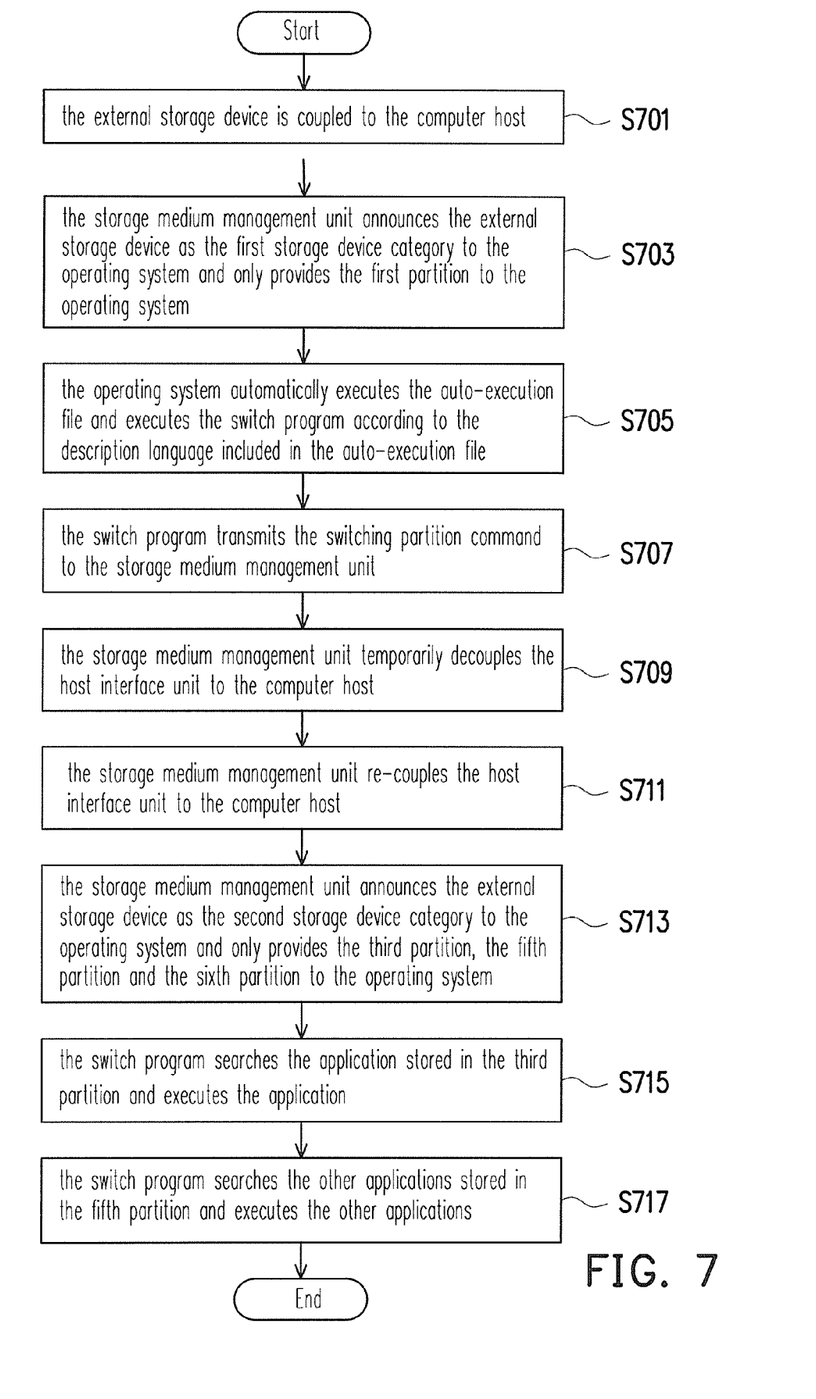
FIG. 7 is a flow chart illustrating an application executing method according to the third exemplary embodiment of the present invention.

FIG. 7 is a flow chart illustrating an application executing method according to the third exemplary embodiment of the present invention.

As shown in FIG. 7, first, in the step S701, the external storage device 6200 is coupled to the computer host 1110.

In the step S703, the storage medium management unit 6228 announces the external storage device 6200 as the first storage device category (i.e. the compact disc-read only memory) to the operating system 1122 and only provides the first partition 1202 to the operating system 1122.

Then, in the step S705, the operating system 1122 automatically executes the auto-execution file 1302 and executes the switch program 1304 according to the description language included in the auto-execution file 1302.

In the step S707, the switch program 1304 transmits the switching partition command to the storage medium management unit 6228. Thereafter, in the step S709, the storage medium management unit 6228 temporarily decouples the host interface unit 1224 to the computer host 1110 and, in the step S711, the storage medium management unit 6228 re-couples the host interface unit 1224 to the computer host 1110. Then, in the step S713, the storage medium management unit 6228 announces the external storage device 6200 as the second storage device category (i.e. the removable storage device) to the operating system 1122 and only provides the third partition 5202, the fifth partition 6202 and the sixth partition 6204 to the operating system 1122.

In the step S715, the switch program 1304 searches the application 1306 stored in the third partition 5202 and executes the application 1306. Moreover, in the step S717, the switch program 1304 searches the other applications stored in the fifth partition 6202 and executes the other applications.

According to the above descriptions, the present invention uses the general partition of the external storage device to store the applications provided by the manufacture and uses the partition emulated as the compact disc-read only memory to store the auto-execution file and the switch program so that the applications stored in the general partition can be automatically executed. Furthermore, since the applications are stored in the general partition, the difficulty for updating the applications are great decreased. Moreover, the user can easily add other applications so that, when the external storage device is coupled to the computer host, the other applications besides the one provided by the manufacture also can be automatically executed.

The previously described exemplary embodiments of the present invention have many advantages, including automatically executing an application stored in a general partition of an external storage device when the external storage device is coupled to the computer host, wherein the advantages aforementioned not required in all versions of the invention. Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. An application executing method for automatically executing an application stored in a storage unit of an external storage device in an operating system of a computer host, the application executing method comprising:

logically dividing the storage unit into a first partition and a second partition and emulating the first partition as compact disc-read only partition;

programming an auto-execution file and a switch program into the first partition, wherein the auto-execution file is used to automatically execute the switch program and the switch program is used to automatically execute the application;

storing the application into the second partition; and configuring a storage medium controller into the external storage device, wherein, when the external storage device is coupled to the computer host, the storage medium controller only provides the first partition to be identified by the operating system and the auto-execution file is automatically executed by the operating system and the switch program is executed by the auto-execution file and the switch program requests the storage medium controller to decouple the external storage device to the computer host and to re-couple the external storage device to the computer host, wherein, when the storage medium controller re-couples the external storage device to the computer host, the storage medium controller only provides the second partition to be identified by the operating system and the switch program executes the application.

2. The application executing method of claim 1, further comprising:

self-terminating the switch program after the switch program executes the application.

3. The application executing method of claim 1, further comprising dividing the second partition into a third partition and a fourth partition, wherein the application is stored into the third partition.

4. The application executing method of claim 3, further comprising setting the third partition as a read-only partition and setting the fourth partition as a readable and writable partition.

5. The application executing method of claim 3, further comprising dividing the fourth partition into a fifth partition and a sixth partition, wherein at least another application is stored into the fifth partition.

6. The application executing method of claim 5, wherein, when the storage medium controller has the external storage device re-coupled to the computer host, the switch program executes the at least another application stored in the fifth partition.

7. The application executing method of claim 1, further comprising:

when the external storage device is coupled to the computer host, announcing the external storage device as a first storage device category to the computer host; and when the storage medium controller has the external storage device re-coupled to the computer host, announcing the external storage device as a second storage device category to the computer host, wherein the first storage device category is different from the second storage device category.

8. An application executing system for automatically executing an application in an operating system, the application executing system comprising:

a computer host having a built-in storage device, wherein the built-in storage device is installed with the operating system; and an external storage device, comprising:

a storage unit having a first partition and a second partition, wherein the application is stored in the second partition;

an auto-execution file and a switch program configured in the first partition; and a storage medium controller coupled to the storage unit for emulating the first partition as a compact disc-read only partition, wherein, when the external storage device is coupled to the computer host, the storage medium controller only provides the first partition to be identified by the operating system and the operating system automatically executes the auto-execution file and the auto-execution file executes the switch program and the switch program requests the storage medium controller to decouple the external storage device to the computer host and to re-couple the external storage device to the computer host, wherein, when the storage medium controller re-couples the external storage device to the computer host, the storage medium controller only provides the second partition to be identified by the operating system and the switch program executes the application.

9. The application executing system of claim 8, wherein the switch program is self-terminated after the switch program executes the application.

10. The application executing system of claim 8, wherein the second partition comprises a third partition and a fourth partition and the application is stored into the third partition.

11. The application executing system of claim 10, wherein the storage medium controller sets the third partition as a read-only partition and sets the fourth partition as a readable and writable partition.

12. The application executing system of claim 8, wherein, when the external storage device is coupled to the computer host, the storage medium controller announces the external storage device as a second storage device category to the computer host, wherein, when the storage medium controller has the external storage device re-coupled to the computer host, the storage medium controller announces the external storage device as a second storage device category to the computer host, wherein the first storage device category is different from the second storage device category.

13. A storage medium controller for receiving a command from an operating system of a computer host and for controlling a storage unit of an external storage device, wherein the storage unit comprises a first partition and a second partition, the first partition stores an auto-execution file and a switch program, and the second partition stores an application, the storage medium controller comprising:

a microprocessor unit;
a storage medium interface unit coupled to the microprocessor unit for coupling to the storage unit;
a host interface unit coupled to the microprocessor unit for coupling to the computer host; and
a storage medium management coupled to the microprocessor unit for emulating the first partition as a compact disc-read only partition, wherein, when the external storage device is coupled to the computer host, the storage medium management unit only provides the first partition to be identified by the operating system and the operating system automatically executes the auto-execution file and the auto-execution file executes the switch program and the switch program requests the storage medium management unit to decouple the host interface unit to the computer host and to re-couple the host interface unit to the computer host, wherein, when the storage medium management unit re-couples the host interface unit to the computer host, the storage medium management unit only provides the second partition to be identified by the operating system and the switch program executes the application.

14. The storage medium controller of claim 13, wherein, when the host interface unit is coupled to the computer host, the storage medium management unit announces the external storage device as a second storage device category to the computer host, wherein, when the storage medium management unit re-couples the host interface unit to the computer host, the storage medium management unit announces the external storage device as a second storage device category to the computer host, wherein the first storage device category is different from the second storage device category.

15. An external storage device, comprising:

a connector;
a storage unit having a first partition and a second partition, wherein the first partition stores an auto-execution file and a switch program and the second partition stores an application; and
a storage medium controller coupled to the connector and the storage unit for emulating the first partition as a compact disc-read only partition, wherein, when the connector is coupled to a computer host, the storage medium controller only provides the first partition to be identified by an operating system of the computer host and the operating system automatically executes the auto-execution file and the auto-execution file executes the switch program and the switch program requests the storage medium controller to decouple the connector to the computer host and to re-couple the connector to the computer host, wherein, when the storage medium controller re-couples the connector to the computer host, the storage medium controller only provides the second partition to be identified by the operating system and the switch program executes the application.

16. The external storage device of claim 15, wherein the switch program is self-terminated after the switch program executes the application.

17. The external storage device of claim 15, wherein the second partition comprises a third partition and a fourth partition and the application is stored into the third partition.

18. The external storage device of claim 15, wherein, when the connector is coupled to the computer host, the storage medium controller transmits identification information to the computer host, wherein the identification information comprises a first storage device category, wherein, when the storage medium controller has the connector re-coupled to the computer host, the storage medium controller transmits the other identification information to the computer host, wherein the another identification information comprises a second storage device category, wherein the first storage device category is different from the second storage device category.

19. A application executing method, comprising:

providing a storage unit having a first partition and a second partition, wherein the first partition has an auto-execution file and a switch program and the second partition has the application;

when the external storage device is coupled to a computer host, only providing the first partition by a storage medium controller of the external storage device for an operating system of the computer host to identify, and the operating system executes the switch program through the auto-execution file; and informing the storage medium controller by the switch program to only provide the second partition for the operating system to identify, and executing the application by the switch program after the operating system identifies the second partition.

20. The application executing method of claim 19, further comprising:
announcing the first partition as a first storage device category; and
announcing the second partition as a second storage device category, wherein the first storage device category is different from the second storage device category.

* * * * *